Figure 7:
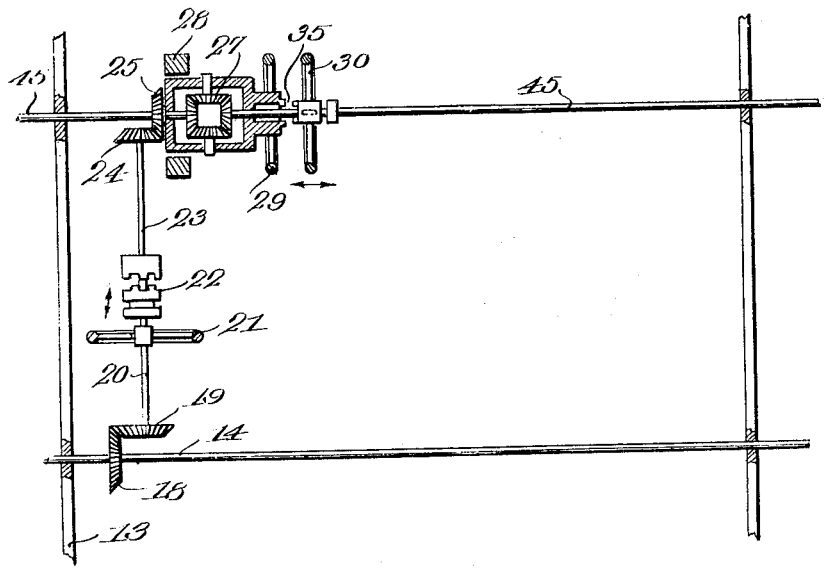
Figure 8:
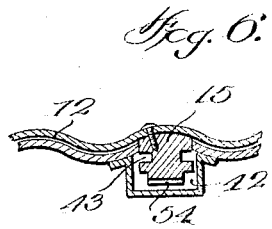

Sept. 3, 1940.                    E. F. ZAP                    2,213,791
                           EXTENDIBLE AIRFOIL
                         Filed July 21, 1937            2 Sheets-Sheet 1

INVENTOR.
Edward F. Zap
BY Max W. Munck
ATTORNEYS.

Patented Sept. 3, 1940

2,213,791

UNITED STATES PATENT OFFICE 2,213,791

EXTENDIBLE AIRFOIL

Edward F. Zap, West Chester, Pa.

Application July 21, 1937, Serial No. 154,901

3 Claims. (Cl. 244—42)

This invention relates to an airfoil in which the area and the camber can be changed and the airfoil can be opened from a closed structure to a gapped structure and vice versa.

My airfoil is far superior to other such airfoils with regard to the efficiency available in combination with high lift capacity, whereby the high lift capacity can profitably be used for take off, slow flight, and for climb, not for landing only. My airfoil offers also at the election of the pilot a large drag in combination with an even higher lift capacity, so that it is also useful for landing. My airfoil has available its entire maximum thickness for the accommodation of structural members such as the spars. My airfoil can be extended without any shift of its center of pressure, is simple in design, easy to extend and retract, cheap, light, safe, and efficient.

These advantages are obtained by the provision of slidable or shiftable rear and front panels forming in the retracted condition top portions of the airfoil, and which can be used each by themselves or in combination. It is a very essential part of my invention that the dimensions of said panels and their mode of movement are specially adapted to the aerodynamic action of modern efficient wing sections and are calculated to preserve and enhance their favorable airflow. My airfoil has in its retracted condition the contour of a modern efficient wing section, preferably one without concave portions of its contour.

Here, and in the following specification and claims, I mean by "modern efficient wing sections" the class represented by and having substantially the same shape characteristics as the series of profiles shown on page 6 of the Techn. Report No. 460, by Jacobs et al., of the National Advisory Committee for Aeronautics. As well known, and as can be seen in that report, their contour is continuous in direction at all points except for a fairly sharp trailing edge. The leading edge is also round. The thickness increases rapidly from the leading edge to a maximum thickness at a station in the front half of the chord. Behind that station it gradually and continuously subsides.

I have discovered that these modern wing sections can be very advantageously and efficiently combined with extendible top panels, either in rear, or in front, or both, and have found how that must be done, in order that their high aerodynamic efficiency and structural efficiency be not only preserved, but actually enhanced. The region of largest thickness is never occupied by either panel, so that the maximum thickness of the airfoil is fully preserved during the process of extending the same from smallest to a larger area, and said thickness is fully available for the accommodation of the spar. I have found that the aerodynamic consideration likewise calls for such thickness-preserving feature and is in full harmony therewith. In order that the full advantage of the basic wing section be preserved, they should furthermore dominate, and the panels should subordinate themselves in cross section to the contracted wing profile. The panels shall be less voluminous than the fixed airfoil, in that their cross section shall have a much smaller areal measure than the cross section of the fixed airfoil. Each panel chord, and hence panel area, should also be smaller than the total wing chord or area respectively. The overhang of the panels should be a fraction only of the wing chord. I have found that extending to a comparatively small overhang in the rear, only a small percentage of the chord, brings about a remarkable increase of the lift, without interfering with the efficient air flow over any portion of the section. For that purpose it is further necessary that the leading edge of the rear panel be sharp and that it slide along on top and in contact with the fixed wing. I prefer to dispense with a gap-closing bridge on top of said panel, but if employed said leading panel edge should move along a line substantially coinciding with the top line of the fixed wing. The front panel, however, if one is employed, should not slide in such manner, but has to be bodily and substantially translationally shifted forwardly into gapped relation to the fixed wing, and after having been so shifted and a substantial gap has been formed, the incidence angle of the front panel shall be decreased to fit the airfoil for landing, in a manner explained and illustrated further below.

I have furthermore found it highly advantageous and necessary in order to obtain the full advantages of my invention, to dispense with any structural extension projecting out into the open air while the airfoil is not extended. Any such extension seems to interfere with obtaining the full efficiency characteristic of modern wing sections.

The principal objects of the present invention are accordingly to provide for:

An airfoil having sufficient space for structural members,

An airfoil that can be modified to offer a small resistance,

An airfoil that can be modified to produce a large lift in combination with a comparatively small drag, An airfoil that can be modified to produce an even larger lift in combination with a comparatively large drag, An airfoil the aerodynamic characteristics of which can be modified without an appreciable travel of its center of pressure, and An airfoil with the above functions having a simple construction, light weight, and superior efficiency.

These and other objects and advantages of my invention will be illustrated in the accompanying drawings and described in the specification, a certain preferred embodiment being disclosed by way of illustration only, for, since the underlying principles may be incorporated in other specific devices it is not intended to be limited to the one here shown, except as such limitations are clearly imposed by the appended claims.

In the drawings, like numerals refer to similar parts throughout the several views, of which Fig. 1 represents a cross section at right angle to the span through an air foil incorporating the invention, showing the not-extended airfoil in solid line, and the extendible portions extended into several positions in broken line, Fig. 2 represents in cross section on line 2—2 of Fig. 1 the mechanism used for manipulating the rear extension member, Fig. 3 represents in a smaller scale a top view of the air foil of Fig. 1, Fig. 4 represents, as the front portion of Fig. 1, but in larger scale and more detailed, the mechanism used for manipulating the front extension member.

Fig. 5 represents said mechanism as seen from the rear, and in partial cross section on line 5—5 of Fig. 1, Fig. 6 represents a cross section through the upper portion of the airfoil on the line 6—6 of Fig. 1, and Fig. 7 represents in a schematic manner a train and combination of gear members that may be employed for the manipulation of the panels of Figs. 1 and 2, thus illustrating the motions to be performed.

In Fig. 1, solid lines, there is shown a thick airfoil having a modern efficient wing section, with the contour 41. The profile is doubly cambered in that the hollow of the contour is at all points directed to the inside. The leading edge L is at a nose portion which is well rounded. The trailing edge T is sharply pointed. The largest thickness is at the point G, which is ahead of the 50% station at M. The maximum thickness is 20% of the chord L—T.

On top of the fixed airfoil, portion 10, for shortness' sake called "fixed airfoil," at the front region between stations H and K, a front panel 11 is provided, and in rear, between the stations F and T, a rear panel 12 is provided. Said panels are made of a single layer of sheet metal, so that between F and T, and between H and K, the airfoil appears doubly covered, by a fixed cover and the panel on top of same. H is at the station 2% of the chord, whereby in the usual manner the leading edge is considered 0% and the trailing edge is considered 100%. K is at the station 25% and ahead of the point G. The contour 42 encloses the fixed airfoil 10 and the two panels.

Rear panel 12 is in gliding contact with the top of the fixed airfoil 10, and it is shown that its leading edge F is in such gliding contact. The rear portion of the top side of the contour of modern efficient wing sections is almost circular, and as far as that is the case, the entire panel 12 can be put in gliding contact. Rear panel 12 is fastened to a plurality of battens 15 positioned in grooves 42 of airfoil 10. These battens are curved, preferably circularly. They have side guiding grooves 43 for the reception of guide brackets 44 fastened to the fixed airfoil structure shown as simple gliding pieces in the drawings, but preferred to be friction diminishing by the use of rollers, not shown in the drawings. The battens have cut in their bottom a gear teeth rack 54 in mesh with pinions 17 mounted on a shaft 45 extending to the span from the fuselage 13 up to the last batten outside; there being separate shafts 45 on the left and the right side of the fuselage 13. When shaft 45 is turned, battens 15 and panel 12 slide in chord direction out and beyond the trailing edge T of the airfoil or back again.

In its extreme protracted position rear panel 12 occupies the position designated in Fig. 1 by E. The trailing edge 51 of the rear panel extends then 30% of the chord L—T beyond the trailing edge T of the contracted airfoil with the contour 41. There is no gap in rear of the airfoil, but the upper camber of the rearwardly extended airfoil forms an interrupted smooth surface, except possibly for an almost imperceptible step at F. In that rearwardly protruded position, the lower camber line has an inwardly curved corner at F, but not outwardly or protruding corner or edge.

The front panel 11 is securely held at hinge points 32 and 34. At 32 it is hinged to straight rods or channel pieces 31 shiftably mounted on the stationary airfoil structure 39, movable substantially in the direction of the wing chord. On top, the channel pieces 31 are provided with a gear teeth rack 46 in mesh with pinions 40 mounted on shaft 14. At point 49 of rod 31 there is hinged a lever hinged to front panel 11 at point 34 at its one end, and guided at point 36 at its other end. A cam member 47 is rigidly fastened to the rigid wing structure 39. It has a slot 37, the larger portion of which is straight and parallel to channel 31. The forward end of slot 37 is bent up.

In its unextended position, front panel 11 lies flush with the airfoil surface. As shaft 14 is turned, channels 31 are moved forward, moving with them panel 11. Since the then active portion of slot 37 is parallel to the channel, lever 33 does not turn relative to the channel, and hence points 32 and 34 move parallel and by equal amounts, whereby panel 11 is protracted translationally, without turning but remaining parallel to its initial direction. When so moved, and until finally reaching its position B of Fig. 1, there is formed a gap 26 between leading edge L and panel 11.

When shaft 14 is further turned, end 36 of lever enters the curved portion of slot 37. In consequence, the lever is now turned, and point 34 is depressed relative to point 32. In consequence, in the final position C of panel 11, the angle of attack or incidence of the panel is smaller in its fully extended position C than in its initial and intermediate position. In the position B, the front cover is moved out by about 25% of the unextended wing chord L—T; in the position C it is moved out by another 5% by altogether about 30% of the unextended wing chord.

Front shaft 14 has fixedly mounted a miter gear 18 in mesh with miter 19 on shaft 20 mounted in the fuselage. Said shaft has mounted on it a handwheel 21 and a clutch 22 adapted to couple shaft 20 to shaft 23, the latter being also mounted in the fuselage. 23 has at its other end a second miter 24 in mesh with miter 25 fastened to differential 27 connecting the two shafts 45. Brake 28 can be used to lock the housing of differential 27 against turning. Said housing has further a handwheel 29 and the right shaft 45 has likewise a handwheel 30. Clutch 35 is adapted to couple handwheels 29 and 30, which amounts to coupling shaft 45 to the housing of the differential.

This arrangement permits of the following control motions. 35 coupled, brake 28 relieved: both shafts 45 turn bodily together, and hence both rear panels 12 move parallel. If in this case 22 is coupled, the front panels move likewise together with the rear panels in a predetermined ratio thereto. It is preferred to so predetermine said ratio that the center of pressure of the airfoil remains substantially at a fixed location while all panels are moved. If, however, 22 is open, both front and rear panels can be moved independently of each other, whereby in all cases so far discussed the left side and the right side of the airfoil is modified in the same manner.

For using the panels for aileron action, 22 is opened, 28 relieved, or lifted, 35 opened. Wheel 30 will now shift the left rear panel oppositely to the right one and leave the front panels unaffected.

By the use of the rear panels 12 by themselves, the maximum lift coefficient of the unextended airfoil can be doubled. The inventor contemplates such use of the rear panels by themselves, in which case the front panels need not be incorporated in the air foil. Even then, the drag remains relatively small.

It is preferred to use the front panels in addition. This raises the lift to almost three times of that of the unextended airfoil. When extended to the position B, the drag remains small, so that the lift-over-drag ratio has a favorable value, making the device useful for take off, slow flight, and for climb. When farther forwarded, and up to position C, the lift is increased to its highest value, and moreover the drag is considerably increased, making the airfoil useful for landing.

In operation, the pilot will fly at high speed with the extension members retracted. For take off and climbing, he will extend both, front and rear, 10% up to 20%, for landing up to 30%. The center of pressure is then about at 25% of the unextended airfoil, about where it was in the unextended position. For landing, the front part will be extended up to position C.

The remarkable result of the arrangement is that in the 25% extension of both panels the profile drag has increased comparatively less than the lift has. The center of pressure follows in a manner both panels when moved each by themselves. When extended simultaneously this effect is practically neutralized, so that the center of pressure in the 30% extension is practically at the same position as with the unextended airfoil, and no excessive tail surfaces and tail control is required for reaping the benefit of this profile modification.

These results were carefully checked in wind tunnel work, and are authentic.

I claim:

1. The combination of: a fixed airfoil; a translationally shiftable front panel in front and upper relation to the airfoil, the leading edge of the front panel in its retracted position being higher than the leading edge of the airfoil; a slidable rear panel in rear and upper relation to the airfoil, the leading edge of the rear panel being in sliding contact with the upper side of the airfoil, the panel chords being smaller in sum than the airfoil chord, the maximum panel thickness being considerably smaller than the maximum thickness of the airfoil, the airfoil and the panels in retracted position having together a modern efficient wing section contour, means for moving the panels relative to the airfoil in substantially chordwise direction adapted to move the front panel into tandem relation with the airfoil with a pronounced chordwise distance between the leading edge of the airfoil and the trailing edge of the front panel, and control means for changing the incidence of the front panel during flight when in gapped relation to the airfoil.

2. A gapped airfoil assembly composed of a major rear airfoil having a modern efficient double-cambered wing section and of a minor considerably thinner and shorter front airfoil in gapped relation to the rear airfoil, the leading edge of the front airfoil being higher than the leading edge of the rear airfoil, the trailing edge of the minor airfoil being pronouncedly spaced in chordwise direction from the leading edge of the major airfoil, and the upper camber of the thin front airfoil being substantially parallel to the front portion of the upper camber of the rear airfoil having equal distance from the chord of the rear airfoil, and having unitary control means for translationally shifting the front airfoil in substantially chordwise direction and diminishing the incidence of said front airfoil during flight relative to the described position.

3. The combination with a fixed main airfoil having a curved rear upper surface, of curved battens slidably supported within upwardly open chordwise directed grooves in the rear portion of the upper surface of said main airfoil and adapted to be rearwardly protruded thereout, an auxiliary airfoil curved to conform to the curvature of the rear upper surface of said main airfoil fastened to said battens, its leading edge being in slidable contact with the upper rear surface of the main airfoil, the thickness of the auxiliary airfoil being substantially constant and considerably smaller than the maximum main airfoil thickness, the retracted auxiliary airfoil and the main airfoil having together a modern efficient wing section contour, and means for sliding the battens in substantially chord-wise direction.

EDWARD F. ZAP.